United States Patent
Park et al.

(10) Patent No.: US 8,610,870 B2
(45) Date of Patent: Dec. 17, 2013

(54) AIR-COOLING APPARATUS AND DISPLAY DEVICE HAVING THE SAME

(75) Inventors: Jae-hyun Park, Seoul (KR); Jeong-ho Nho, Suwon-si (KR); Jean Hur, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 12/902,589

(22) Filed: Oct. 12, 2010

(65) Prior Publication Data

US 2011/0273656 A1 Nov. 10, 2011

(30) Foreign Application Priority Data

May 4, 2010 (KR) .................. 10-2010-0041961

(51) Int. Cl.
- *G02F 1/1333* (2006.01)
- *G02F 1/1335* (2006.01)
- *F28D 15/00* (2006.01)
- *H05K 7/20* (2006.01)
- *F24F 7/06* (2006.01)

(52) U.S. Cl.
USPC .......... 349/161; 349/5; 165/104.34; 361/690; 454/251

(58) Field of Classification Search
USPC ............ 349/5–10, 161; 165/104.34; 361/690; 484/251; 353/57, 58, 60, 61
See application file for complete search history.

(56) References Cited

U.S. PATENT DOCUMENTS

| | | | | |
|---|---|---|---|---|
| 6,132,049 A * | 10/2000 | Yamaguchi et al. | ............ | 353/61 |
| 6,832,837 B2 * | 12/2004 | Suzuki et al. | ................... | 353/61 |
| 7,942,234 B2 * | 5/2011 | Utsunomiya | ................. | 181/225 |
| 2005/0036115 A1 * | 2/2005 | Kim et al. | ........................ | 353/61 |
| 2007/0019164 A1 * | 1/2007 | Nakagawa et al. | ............. | 353/20 |
| 2008/0252859 A1 * | 10/2008 | Nagahata et al. | ............... | 353/61 |
| 2009/0147158 A1 * | 6/2009 | Endo | ................................ | 349/5 |
| 2009/0237619 A1 * | 9/2009 | Yanagisawa et al. | ........... | 353/54 |
| 2010/0060858 A1 * | 3/2010 | Minami | ......................... | 353/20 |

\* cited by examiner

*Primary Examiner* — Edward Glick
*Assistant Examiner* — Dennis Y Kim
(74) *Attorney, Agent, or Firm* — Sughrue Mion, PLLC

(57) ABSTRACT

An air-cooling apparatus which cools an imaging unit with a plurality of LCD panels and a polarizer assembly includes a cooling fan, and a cooling duct which directs air expelled from the cooling fan onto the plurality of LCD panels and the polarizer assembly, and the cooling duct includes a plurality of channels corresponding to the plurality of LCD panels, and at least two channels from among the plurality of channels are bent in a vertical direction.

16 Claims, 7 Drawing Sheets

AIR-COOLING APPARATUS AND DISPLAY DEVICE HAVING THE SAME

CROSS-REFERENCE TO RELATED APPLICATIONS

This application claims priority from Korean Patent Application No. 10-2010-0041961, filed in the Korean Intellectual Property Office on May 4, 2010, the disclosure of which is incorporated herein by reference.

BACKGROUND

1. Field

Aspects of the exemplary embodiments relate to an air-cooling apparatus which cools an imaging unit having a plurality of liquid crystal display (LCD) panels and a display apparatus having the same.

2. Description of the Related Art

An imaging unit which is used for a beam projector or a projection television forms a color image using an LCD panel with one or three LCD panels (red, green, and blue), and the LCD panels project an image on a projection screen along with the light projected from a light source.

Generally, a high-luminance light source consumes more electric power than a low-luminance light source and could cause thermal damage to the LCD panel when light is penetrated or concentrated on the LCD panel. If thermal damage occurs on the LCD panel and a polarizer which is formed on the front portion of the LCD panel, image quality and contrast deteriorate due to color change.

Therefore, a display apparatus which forms a screen by gathering light has a channel for airflow to cool the LCD panel of an optical module and the polarizer.

If there is only one LCD panel, an air-cooling channel may be formed without any problem. However, if there are multiple LCD panels and polarizers for red, green and blue colors respectively, a cooling fan should be installed for each LCD panel and polarizer or more than two cooling fans should be installed to form an airflow channel. If a plurality of cooling fans are used, set volume as well as noise may increase. Alternatively, if a duct is used to form an airflow channel instead of a cooling fan, the length of the airflow channel is extended, decreasing cooling capability.

SUMMARY OF THE INVENTION

Exemplary embodiments relate to an air-cooling apparatus of which structure is improved to reduce the number of parts, cut manufacturing cost, and make the set smaller and quieter, and a display apparatus having the same.

According to an aspect of an exemplary embodiment, there is provided an air-cooling apparatus which cools an imaging unit with a plurality of LCD panels and a polarizer assembly, the air-cooling apparatus including a cooling fan which expels air and a cooling duct which directs air expelled from the cooling fan onto the plurality of LCD panels and the polarizer assembly, and the cooling duct includes a plurality of channels corresponding to the plurality of LCD panels, and at least two channels from among the plurality of channels are bent vertically.

The plurality of LCD panels may include red, green, and blue LCD panels and the polarizer assembly may include red, green, and blue LCD polarizers, and the cooling duct may include a first channel which blows air onto the red LCD panel and a red polarizer, a second channel which blows air onto the green LCD panel and a green polarizer, and a third channel which blows air onto the blue LCD panel and a blue polarizer.

The first and the second channels may be branched horizontally relative to one another, and the second and the third channels may be branched vertically relative to one another.

The first channel may be narrower than the second channel, and the second and the third channels may be have a same width.

The first channel may include a first air flow direction changing member, a second channel may include a second air flow direction changing member, and the third channel may include a third air flow direction changing member, wherein the first, second, and third air flow direction changing members refract air flow from a horizontal direction to a vertical direction perpendicular to the horizontal direction, and the first and the third air flow direction changing members may be installed higher in the vertical direction than the second air flow direction changing member.

The discharge nozzle may include a plurality of first discharge nozzles which respectively cool the red, green, and blue LCD panels and a plurality of second discharge nozzles which respectively cool the red, green, and blue polarizers, and the second discharge nozzles may be disposed inside the first discharge nozzles.

The first and second discharge nozzles may have a same height.

According to an aspect of another exemplary embodiment, there is provided a display apparatus including a lighting system a projection system, and an imaging unit, and an air-cooling apparatus which cools the imaging unit by air.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
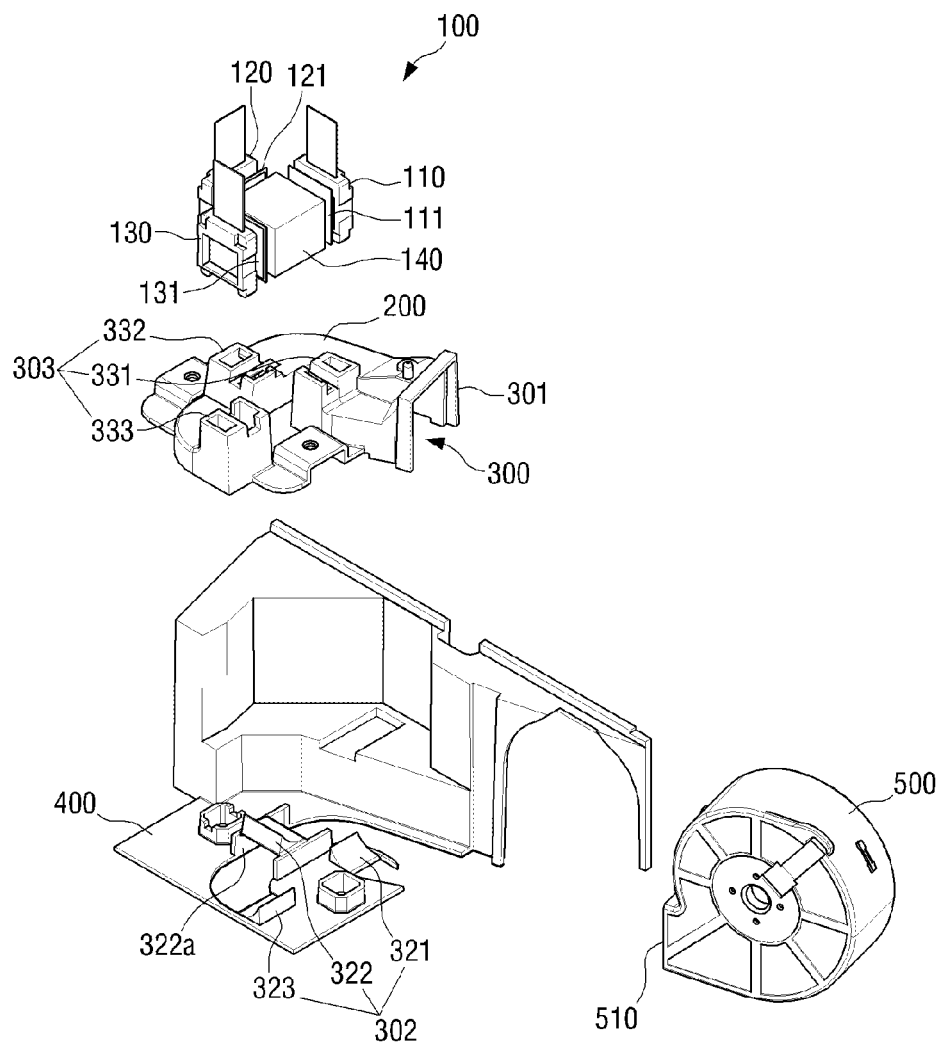
FIG. 1 is an explosive perspective view illustrating an air-cooling apparatus according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

As illustrated in FIG. 1, an air-cooling apparatus 100, according to an exemplary embodiment, includes a first housing 200, a cooling duct 300, a second housing 400, and a cooling fan 500.

An imaging unit comprising red, green, and blue LCD panels 110, 120, 130, red, green, and blue polarizers 111, 121, 131 which are installed on the red, green, and blue LCD panels 110, 120, 130 respectively, and a prism 140 which distributes light received from an illuminating system (not shown) to the LCD panels 110, 120, 130 is installed on the upper portion of the first housing 200.

The second housing 400 is installed on the lower portion of the first housing 200, and the cooling duct 300 is formed by combination of the first housing 200 and the second housing 400. The cooling fan 500 is coupled to the cooling duct 300 and draws in surrounding air and expels the drawn-in air to the outside, and may be for example a centrifugal fan.

Figure 3:
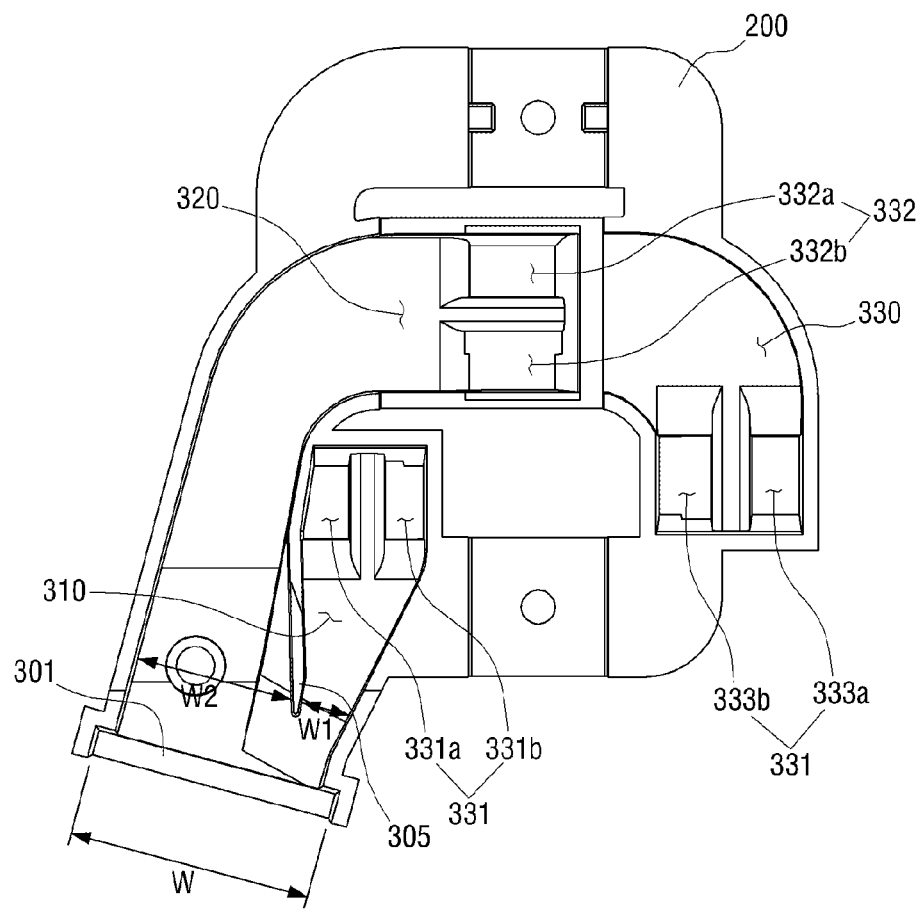
FIG. 3 is a bottom view of a first housing in FIG. 1.
Figure 4:
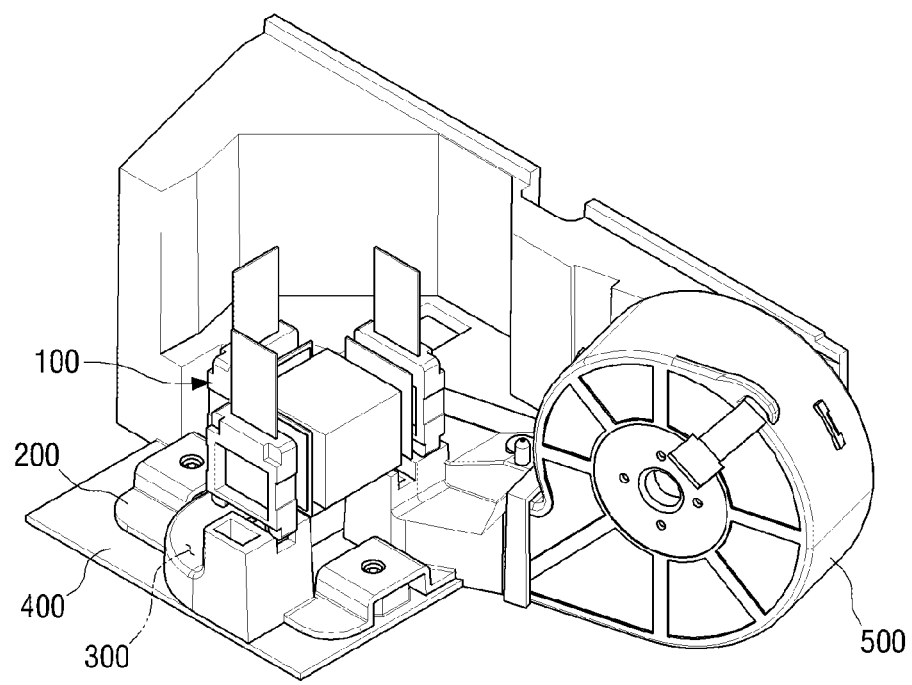
FIG. 4 is an assembly perspective view illustrating an air-cooling apparatus according to an exemplary embodiment.

The cooling duct 300 is formed by combination of the first housing 200 and the second housing 400, and includes a first to a third channels 310, 320, 330 (as shown in FIG. 3) including a duct entrance 301, an air flow direction changing member 302, and a discharge nozzle 303.

The first channel 310 blows air into the red LCD panel 110 and the red polarizer 111, the second channel 320 blows air into the green LCD panel 120 and the green polarizer 121, and the third channel 330 blows air into the blue LCD panel 130 and the blue polarizer 131.

In this case, the second channel 320 may be branched from the first channel 310 in a horizontal direction and extended for a predetermined distance, and then may be bent at 85 to 95 degrees in an "L" shape with respect to the first channel, forming a bending unit, which includes a convex surface. The third channel 330 may be branched from the second channel 320 in a vertical direction and extended for a predetermined distance, and may be bent at degrees in an "L" shape with respect to the second channel, forming a bending unit, which includes a convex surface. As illustrated in FIG. 3, the width W1 of the first channel 310 may be narrower than the width W2 of the second channel 320, and the second channel 320 and the third channel 330 have similar width.

The duct entrance 301 is formed on the first housing 200, and one end of the duct entrance 301 is coupled and sealed to the cooling fan 500. The width W of the duct entrance 301 is formed to correspond to the width of the exit 510 of the cooling fan 500. The branching plate 305 is formed in the adjacent duct entrance 301 to be branched in a horizontal direction with respect to the first channel 310 and the second channel 320. The end of the branching plate 305 is designed to be sharp so as to facilitate the branching of the cooling-air which is drawn in from the cooling fan 500.

Figure 2:
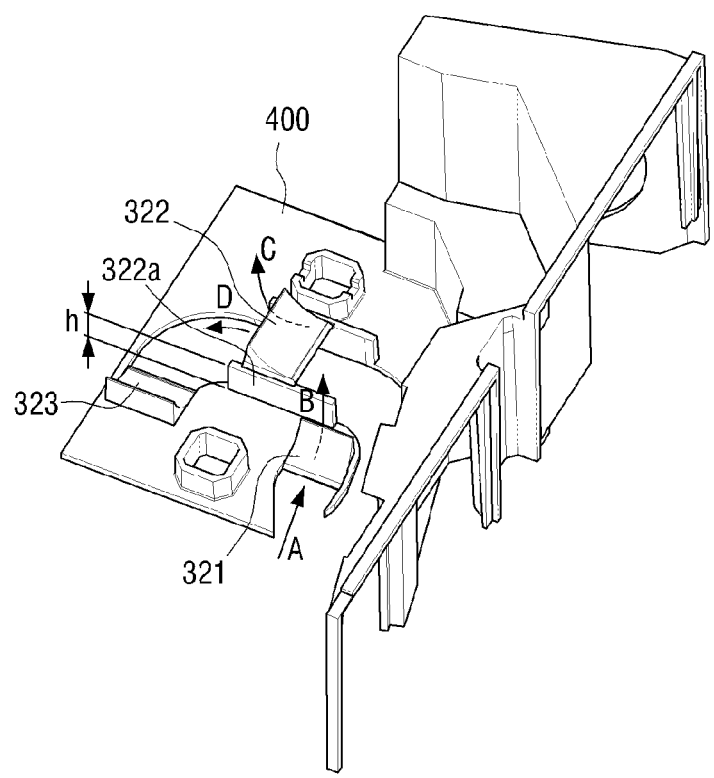
FIG. 2 is a perspective view illustrating a second housing in FIG. 1.
Figure 6:
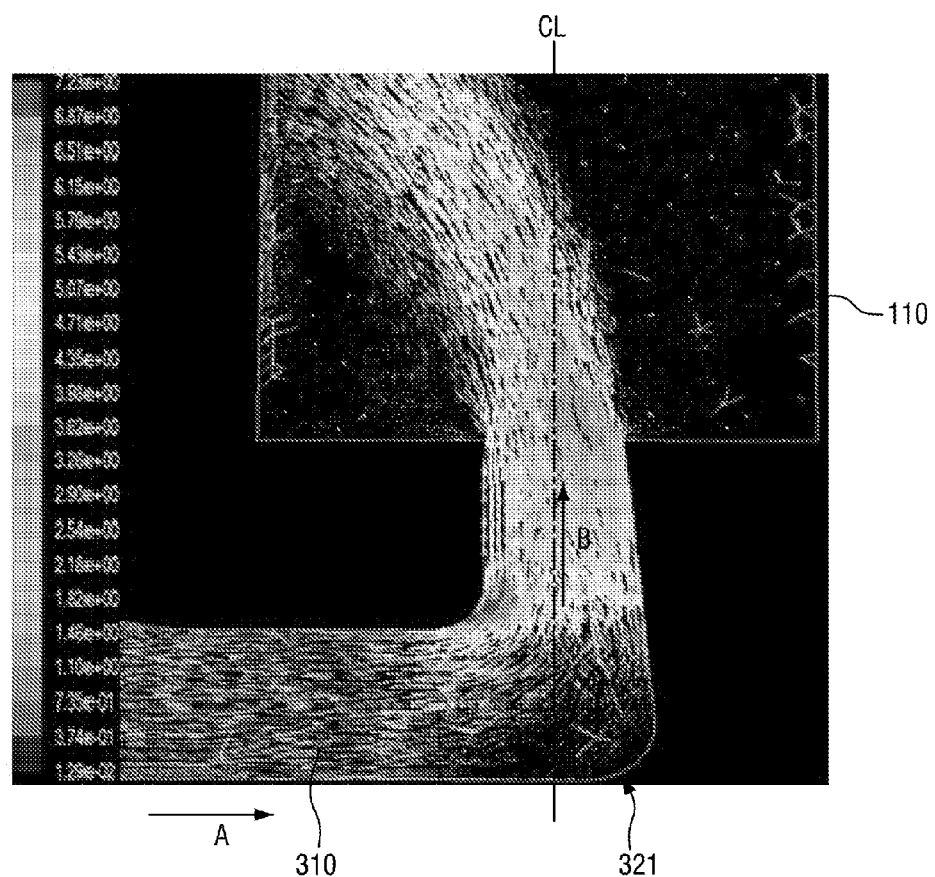
FIG. 6 is a view illustrating a flow of cooling-air in a red LCD panel.

The air flow direction changing member 302 is formed on a bottom of the second housing 400 and refracts the direction of air flowing out of the cooling fan 500. The air flow direction changing member 302 may be formed separately, or may be formed integrally with the second housing 400 when the second housing 400 is injection-molded. As illustrated in FIG. 2, the air flow direction changing member 302 includes the first to the third air flow direction changing members 321, 322, 323 which have a round shape and formed on the first to the third channels 310, 320, 330 respectively. As illustrated in FIG. 2 and FIG. 6, the first to the third air flow direction changing members 321, 322, 323 refracts a direction from which air has flown in from the cooling fan 500 in a horizontal direction as marked with arrow A into a vertical direction as marked with arrow B.

As illustrated in FIG. 2, the second air flow direction changing member 322 may be disposed higher than the first and the third changing members 321, 323 by being installed on an upper portion of a support rib 322a having a predetermined height h.

The discharge nozzle 303 is formed to spray the air drawn in from the cooling fan 500 in the upward direction from below the plurality of LCD panels 110, 120, 130 and the polarizers 111, 121, 131. The discharge nozzle 303 includes first discharge nozzles 331a, 332a, 333a which cool the LCD panels 110, 120, 130 and second discharge nozzles 331b, 332b, 333b which cool polarizers 111, 121, 131. The second discharge nozzles 331b, 332b, 333b may be disposed inside the first discharge nozzles 331a, 332a, 333a, i.e., closer to one another than the first discharge nozzles.

Figure 5:
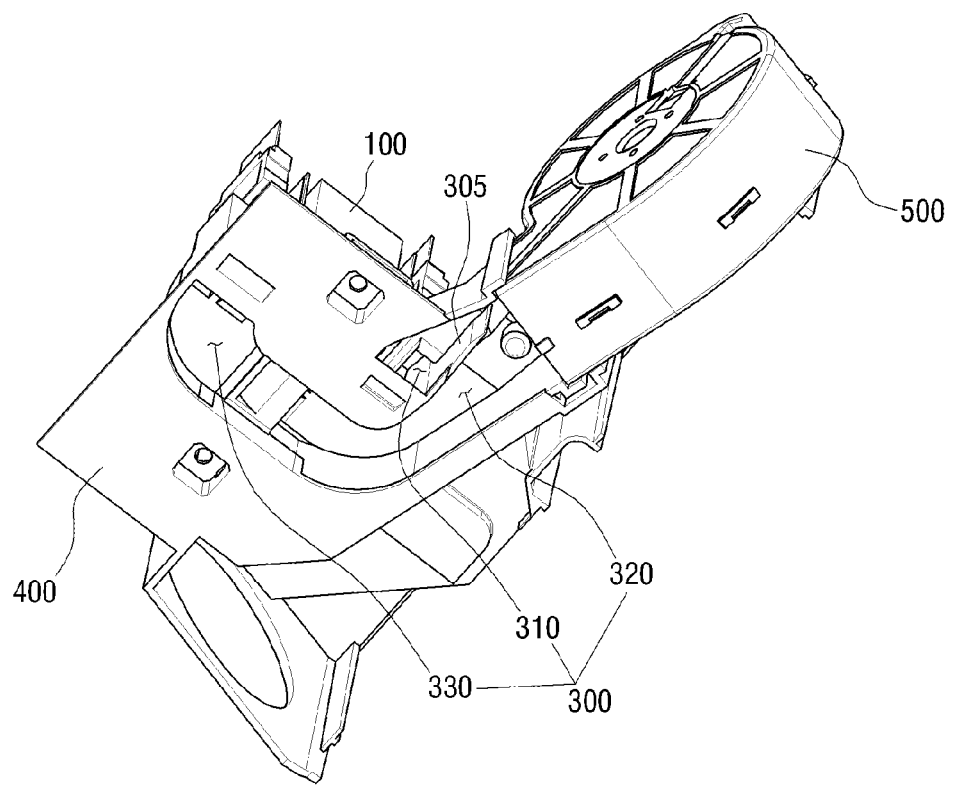
FIG. 5 is a bottom perspective view of FIG. 4.

Hereinafter, the operation of an air-cooling apparatus, according to an exemplary embodiment, will be explained with reference to relevant drawings. As illustrated in FIG. 5, the present air-cooling apparatus guides air flowing from the cooling fan 500 into the red LCD panel 110 and the red polarizer 111, the green LCD panel 120 and the green polarizer 121, and the blue LCD panel 130 and the blue polarizer 131 through the first to the third channels 310, 320, 330.

The air drawn into the duct entrance 310 is divided into the first and the second channels 310, 320 by the branching plate 305. In this case, the width of the first channel 310 may be narrower than the width of the second channel 320. That is because the red LCD panel 110 produces relatively small amount of heat, and thus it can be cooled off with relatively small amount of cooling air, while the green LCD panel 120 and the blue LCD panel 130 require more cooling air to be cooled off.

As illustrated in FIG. 6, the direction of the air drawn into the first channel 310, marked with arrow A, is changed by the first air flow direction changing member 321 into a vertical direction, and thus the air moves in the upward direction, marked with arrow B, from below the red LCD panel 110. In this case, the location and shape of the first air flow direction changing member 321 may be adjusted so that air may pass through the center of the red LCD panel 110. For instance, the round angle of the first air flow direction changing member 321 may be adjusted, or the location of the first air flow direction changing member 321 may be moved so that the central axis of cooling air may pass through the center (CL) of the red LCD panel 120.

Figure 7:
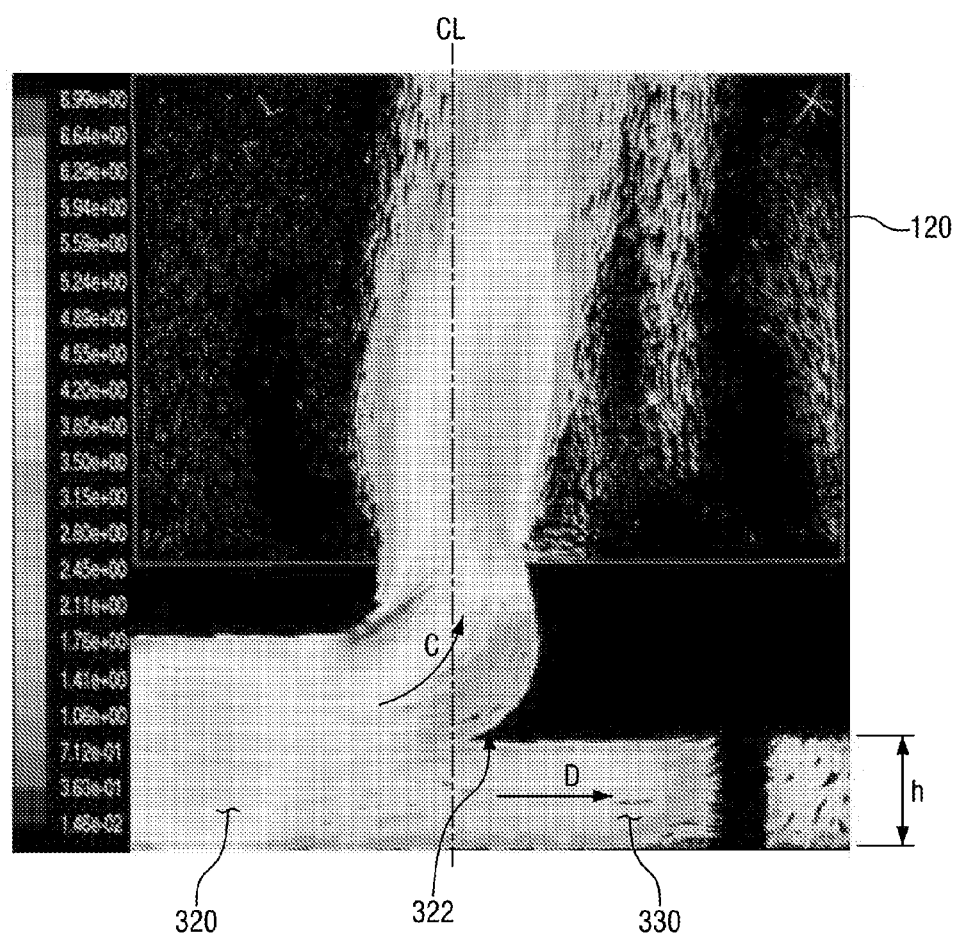
FIG. 7 is a view illustrating a flow of cooling-air in a green LCD panel.

The air drawn into the second channel 320 may flow through the center (CL) of the green LCD panel 120. Since the second air flow direction changing member 322 installed on the second channel 320 is formed on the upper portion of the support rib 322a having a predetermined height h, the second air flow direction changing member 322 is disposed relatively higher than the first and the third air flow direction changing members 321, 323 which are installed on the first and the third channels 310, 330. Accordingly, the air passing through the second channel 320 is branched into an upper portion and a lower portion with respect to the second air flow direction changing member 322, and a relatively large amount of air is emitted along the convex surface of the second air flow direction changing member 322 towards the green LCD panel 120 (see the direction marked with arrow C, FIG. 7), and the remaining air moves towards the third channel 330 (see the direction marked with arrow D, FIG. 7). Since the green LCD panel 120 among the red, green, blue LCD panels 110, 120, 130, receives most heat, and therefore requires a large amount of air to cool off the panel, a relative large amount cooling air is provided to the green LCD panel 120. The second and the third channels 320, 330 are branched into upper and lower portions and the same width is maintained so that the second channel 320 has the same width as the third channel 330. Therefore, speed loss of the air flowing through the channel may be minimized.

The direction of the cooling air drawn into the third channel 330 is changed by the third air flow direction changing member 323 which is disposed having the same height as the first air flow direction changing member 321 installed in the first channel 310. Although not illustrated, the direction of air is changed into a vertical upward direction similar to the first and the second air flow direction changing members 321, 322 so that air flows upwards from below the blue LCD panel 130 as in the red and green LCD panels 110, 120. The location of the third air flow direction changing member 323 may be adjusted so that the center of the cooling air may pass through the center of the blue LCD panel 130.

According to an exemplary embodiment, the first to the third channels 310 to 330 may be formed stereoscopically, and thus the three LCD panels 110 to 130 and polarizers 111, 121, 131 may be fully cooled off by a single cooling fan 500. Particularly, since the second channel 320 and the third channel 330 are branched into upper and lower portions and therefore the width of the cooling duct 300 can be maintained constantly, cooling performance may be enhanced by minimizing speed loss of the cooling air flowing through the cooling duct 300.

According to an exemplary embodiment, three LCD panels and three polarizers may be cooled by a single cooling fan, and thus it is possible to reduce the number of parts, cut manufacturing cost, and make the set smaller and quieter.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. An air-cooling apparatus which cools an imaging unit comprising a plurality of LCD panels and a polarizer assembly, the apparatus comprising:
    a cooling fan which expels air; and
    a cooling duct which directs air expelled from the cooling fan onto the plurality of LCD panels and the polarizer assembly;
    wherein the cooling duct comprises a plurality of channels corresponding to the plurality of LCD panels, and at least two channels from among the plurality of channels are bent vertically,
    wherein the plurality of LCD panels comprises red, green, and blue LCD panels and the polarizer assembly comprises red, green, and blue polarizers,
    wherein the cooling duct comprises a first channel which blows air onto the red LCD panel and a red polarizer; a second channel which blows air onto the green LCD panel and a green polarizer; and a third channel which blows air onto the blue LCD panel and a blue polarizer,
    wherein the first channel comprises a first air flow direction changing member, the second channel comprises a second air flow direction changing member, and the third channel comprises a third air flow direction changing member, and
    wherein the first, second, and third air flow direction changing members refract air flow from a horizontal direction to a vertical direction perpendicular to the horizontal direction, and the first and the third air flow direction changing members are installed higher in the vertical direction than the second air flow direction changing member.

2. The apparatus as claimed in claim 1, wherein the first and the second channels are branched horizontally relative to one another, and the second and the third channels are branched vertically relative to one another.

3. The apparatus as claimed in claim 2, wherein the first channel is narrower than the second channel, and the second and the third channels have a same width.

4. The apparatus as claimed in claim 1, further comprising a plurality of first discharge nozzles which respectively cool the red, green, and blue LCD panels;
    and a plurality of second discharge nozzles which respectively cool the red, green, and blue polarizers,
    wherein the second discharge nozzles are disposed inside the first discharge nozzles.

5. The apparatus as claimed in claim 4, wherein the first and second discharge nozzles have a same height.

6. The apparatus as claimed in claim 1, wherein the second air flow direction changing member splits the air expelled from the cooling fan into a first part which moves in the direction parallel with the first plane and a second part which moves in the direction perpendicular to the first plane.

7. A display apparatus comprising:
    an imaging unit comprising a plurality of LCD panels and a polarizer assembly;
    an air-cooling apparatus which cools the imaging unit,
    wherein the air-cooling apparatus comprises:
    a cooling fan which expels air; and
    a cooling duct which directs air expelled from the cooling fan onto the plurality of LCD panels and the polarizer assembly;
    wherein the cooling duct comprises a plurality of channels corresponding to the plurality of LCD panels, and at least two channels from among the plurality of channels are bent vertically,
    wherein the plurality of LCD panels comprise red, green, and blue LCD panels and the polarizer assembly comprises red, green, and blue polarizers,
    wherein the cooling duct comprises a first channel which blows air onto the red LCD panel and a red polarizer; a second channel which blows air onto the green LCD panel and a green polarizer; and a third channel which blows air onto the blue LCD panel and a blue polarizer,
    wherein the first channel comprises a first air flow direction changing member, the second channel comprises a second air flow direction changing member, and the third channel comprises a third air flow direction changing member, and
    wherein the first, second, and third air flow direction changing members refract air flow from a horizontal direction to a vertical direction which is perpendicular to the horizontal direction, and the first and the third air flow direction changing members are installed higher in the vertical direction than the second air flow direction changing member.

8. The display apparatus as claimed in claim 7, wherein the first and the second channels are branched horizontally relative to one another, and the second and the third channels are branched vertically relative to one another.

9. The display apparatus as claimed in claim 8, wherein the first channel is narrower than the second channel, and the second and the third channels have a same width.

10. The display as claimed in claim 7, further comprising a plurality of first discharge nozzles which respectively cool the red, green, and blue LCD panels; and a plurality of second discharge nozzles which respectively cool the red, green, and blue polarizers,
    wherein the second discharge nozzles are disposed inside the first discharge nozzles.

11. The display apparatus as claimed in claim 10, wherein the first and second discharge nozzles have a same height.

12. The display apparatus as claimed in claim 7, wherein the second air flow direction changing member splits the air expelled from the cooling fan into a first part which moves in the direction parallel with the first plane and a second part which moves in the direction perpendicular to the first plane.

13. An air-cooling apparatus comprising:
a cooling fan which expels air;
a cooling duct configured to receive the air from the cooling fan and configured to direct the air to at least two LCD panels, the cooling duct comprising at least two channels having first portions extending alongside one another along a plane and second portions extending in a direction perpendicular to the plane,
wherein at least one channel comprises a first air flow direction changing member configured to direct air to one of the at least two LCD panels, at least another channel comprises a second air flow direction changing member configured to direct air to another of the at least two LCD panels, and
wherein the first and second air flow direction changing members are configured to refract air flow from a horizontal direction to a vertical direction which is perpendicular to the horizontal direction, and the first air flow direction changing member is installed higher in the vertical direction than the second air flow direction changing member,
wherein the first air flow direction changing member is configured to split the air received from the cooling fan into a first part and a second part, and
wherein the first part of the split air is directed to the one of the at least two LCD panels and the second part of the split air is directed to the second air flow direction changing member and the another of the at least two LCD panels.

14. The air-cooling apparatus according to claim 13, wherein one of the two channels comprises a bend at a location where the first portion of the one channel abuts the second portion of the one channel.

15. The air-cooling apparatus according to claim 14, wherein a width of the two channels are equal to one another.

16. The air-cooling apparatus according to claim 14, wherein the bend of the one channel is disposed above the plane and the other channel among the two channels extends below the bend in the direction.

* * * * *